United States Patent [19]

Lutz

[11] Patent Number: 4,630,345

[45] Date of Patent: Dec. 23, 1986

[54] METHOD FOR MANUFACTURING A CYLINDER UNIT FOR A CYLINDER PISTON COMBUSTION ENGINE

[75] Inventor: Dieter Lutz, Schweinfurt, Fed. Rep. of Germany

[73] Assignee: SACHS-Systemtechnik GmbH, Schweinfurt, Fed. Rep. of Germany

[21] Appl. No.: 591,693

[22] Filed: Mar. 21, 1984

[30] Foreign Application Priority Data

Mar. 24, 1983 [DE] Fed. Rep. of Germany ....... 3310673

[51] Int. Cl.⁴ ........................ B23P 15/00; B23P 19/02; F02F 7/00; B29B 13/00

[52] U.S. Cl. .............................. 29/156.4 WL; 29/525; 29/527.5; 29/DIG. 5; 29/DIG. 10; 29/DIG. 11; 29/DIG. 31; 92/261; 123/193 C; 123/193 CH; 264/239; 264/241; 264/259; 264/271.1; 264/299; 264/328.1

[58] Field of Search ........... 29/156.4 WL, 525, 527.1, 29/527.5, DIG. 5, DIG. 10, DIG. 11, DIG. 31; 92/261; 123/41.72, 169 R, 193 R, 193 CH, 193 C; 164/98, 113, 119, 120; 264/239, 241, 250, 259, 271.1, 299, 328.1, 328.2, 328.3

[56] References Cited

U.S. PATENT DOCUMENTS

| | | | |
|---|---|---|---|
| 1,347,476 | 7/1920 | Allyne | 123/193 CH |
| 2,144,928 | 1/1939 | Moncrieff | 29/156.4 WL |
| 2,737,171 | 3/1956 | Torre | 123/193 C |
| 2,855,911 | 10/1958 | Christiansen | 123/193 CH X |
| 3,069,209 | 12/1962 | Bauer | 29/156.4 WL |
| 3,073,290 | 1/1963 | Stump | 29/156.4 WL |
| 3,215,131 | 11/1965 | Testerini | 123/169 R |
| 3,853,099 | 12/1974 | Feather et al. | 123/193 CH X |
| 3,903,951 | 9/1975 | Kaneko et al. | 29/156.4 WL X |
| 4,003,422 | 1/1977 | Schramm et al. | 164/98 X |
| 4,224,727 | 9/1980 | Miyashita | 29/156.4 WL |

FOREIGN PATENT DOCUMENTS

| | | | |
|---|---|---|---|
| 936347 | 11/1973 | Canada | 29/156.4 WL |
| 600604 | 11/1934 | Fed. Rep. of Germany | 123/193 CH |
| 23037 | 10/1911 | United Kingdom | 123/193 CH |

*Primary Examiner*—Howard N. Goldberg
*Assistant Examiner*—R. S. Wallace
*Attorney, Agent, or Firm*—Toren, McGeady, Stanger, Goldberg & Kiel

[57] ABSTRACT

A cylinder unit of a cylinder-piston-combustion engine comprises a cylinder housing and a lining unit inserted into the cylinder housing. The lining unit consists of a cylindrical liner sleeve and a terminal wall and encloses a combustion space. The terminal wall is integral with the liner sleeve. The lining unit is manufactured by a non-cutting manufacturing method like cold impact forming, hot impact forming, deep drawing, tube reshaping, press molding or injection molding.

45 Claims, 4 Drawing Figures

METHOD FOR MANUFACTURING A CYLINDER UNIT FOR A CYLINDER PISTON COMBUSTION ENGINE

BACKGROUND OF THE INVENTION

This invention relates to a cylinder unit for a cylinder-piston-combustion engine, said cylinder unit comprising a cylinder housing and a lining unit inserted into said cylinder housing, said lining unit enclosing a combustion space and being defined by a cylindrical liner sleeve having an axis and a terminal wall integral with said liner sleeve.

In modern cylinder piston combustion engines the requirements as to precise forming of the combustion space are growing. The usual method of manufacturing are not further adequate for fulfilling said requirements.

STATEMENT OF THE PRIOR ART

In German Pat. No. 600,604 a cylinder unit of a cylinder-piston-combustion engine is known in which a liner sleeve is inserted into a cylindrical bore of a cylinder housing. The liner sleeve is integral with a terminal wall such as to define a lining unit which encloses the combustion space. There is no statement in German Pat. No. 600,604 as to the manufacturing method used for manufacturing the liner unit. It is, therefore, to be supposed that the lining unit has been made in the usual way as a cast member and has been thereafter machined in the usual way.

The manufacturing of a cast lining unit is expensive. Frequently, it is not even possible to machine all surfaces, particularly the internal sufaces of the terminal wall, which are frequently non-planar and non-rotational faces. It is, therefore, not possible to fulfill the requirements as to a high precision of the shape of the combustion space.

OBJECT OF THE INVENTION

It is one object of the invention to provide a cylinder unit with a precisely shaped combustion space at reduced manufacturing expenses and, more particularly, to substantially avoid machining of the lining unit.

SUMMARY OF THE INVENTION

A cylinder unit of a cylinder-piston-combustion engine comprises a cylinder housing and a lining unit inserted into said cylinder housing, said lining unit enclosing a combustion space and being defined by a cylindrical liner sleeve having an axis and a terminal wall integral with said liner sleeve.

According to this invention the lining unit is manufactured by a non-cutting manufacturing method like cold impact forming, hot impact forming, deep drawing, tube reshaping, press molding and injection molding.

It has been found that by the above stated manufacturing methods one can obtain precisely shaped combustion spaces and a surface quality of the liner sleeve which makes machining of the internal surface superfluous in many cases.

If the liner unit consists of metal, the manufacturing by cold impact forming is of particular interest. Besides this cold impact forming also an impact forming at an elevated temperature is possible. Moreover, it is possible to make the liner unit by the deep drawing method, in which one starts from a planar blank which is brought by a plurality of subsequent deep drawing operations into a substantially pot-shaped form. Furthermore, it is possible to manufacture the lining unit on the basis of a section of a tube and more particularly a section of a drawn or extruded tube. This latter method is particularly of interest in cases in which the lining unit has a form defined by rotation of a curve around an axis. When starting from such a tube, one can obtain the terminal wall by diameter reduction of the tube.

Preferred metallic materials for manufacturing the lining units are ferro alloys (iron and steel alloys), light metals and light metal alloys. Among the light metals aluminum and aluminum alloys are of particular interest in view of their good and reproducible sliding properties. Moreover, silicon nitride ($Si_3N_4$) can be used for making the lining unit.

If the lining unit is made of plastic, pressure molding and injection molding can be used.

In view of the high operational temperatures to which the lining unit is subjected, only high temperature resistant plastics can be used. Carbonized plastics are of considerable interest for manufacturing the lining units. In this case the carbonization is performed after the lining unit has been formed. In view of a high mechanical strength, the plastic materials used may be reinforced by fibers and, more particularly, by glass fiber and carbon fiber.

The cylinder housing preferably consists of light metal and, more particularly, of magnesium alloys. Diecasting can be used for manufacturing a light metal cylinder housing. Moreover, it is possible to make the cylinder housing of plastic material, more particularly of thermosettable plastic like phenolic resin. The plastic housing can be reinforced by glass fibers or carbon fibers. Glass fibers have the advantage of lower costs, whereas carbon fibers have the advantage of lower weight.

The cylinder unit of this invention can be manufactured with a very low weight. This is of particular importance for combustion engines which are to be used in portable appliances like chain saws. For such appliances the lining is preferably made of aluminum and the cylinder housing is preferably made of magnesium or plastic. Cylinder housings made of plastic have, moreover, the advantage of a reduced noise level.

While according to German Pat. No. 600,604 the terminal wall of the lining unit is exposed to atmosphere on its side remote from the combustion space, a further feature of the invention consists in that the terminal wall of the lining unit is covered by a terminal wall of the cylinder housing. By this feature a protection for the terminal wall of the container is obtained against mechanical influences so that the lining unit can be manufactured with a relatively small thickness. Such relatively small thickness is of particular importance in view of the provided manufacturing methods. On the other hand, one can provide at least one coolant chamber between the lining unit and the cylinder housing and, more particularly, in the area of the terminal wall of the combustion space, which terminal wall is subject to high temperatures.

When providing the cylinder housing with an end wall facing the end wall of the lining, overlapping openings are necessary in both end walls for spark plugs, injection nozzles and/or gas exchange valves. When providing a spark plug, an injection nozzle or even a valve seat, the respective device can be used for fixing the lining unit with respect to the cylinder housing, both in circumferential direction and in axial direction.

In two-stroke combustion engines the openings for gas exchange channels are usually provided in the circumferential surface of the cylinder. In case of a lining unit there must be, therefore, provided openings in the liner sleeve. The openings or slots in the liner sleeve can be surrounded by ribs, which ribs project beyond the outer circumferential surface of the liner sleeve and engage recesses of the cylinder housing. By engagement of these ribs and recesses the lining unit can be fixed with respect to the cylinder housing. Moreover, the ribs can be used for improving the shape of the edges of the openings, which edges are of high importance for the operation of the engine.

The cylinder housing can be made of two cylinder halves which engage each other in a plane containing the axis of the liner sleeve. The cylinder halves can be integral with corresponding parts of a crank case.

If the cylinder housing is a monoblock housing, it is also possible to insert and more particularly to pressfit the lining unit into the cylinder housing, the lining unit being inserted with the terminal wall as the leading end from the crank-shaft side of the cylinder housing.

Moreover, it is of considerable advantage to manufacture the cylinder housing in using the lining as a part of a mold. This can be performed more particularly by usual casting, die-casting and injection molding methods.

The liner sleeve can be made with an oval-shaped or elliptical cross-sectional area. Such a non-circular cross-sectional area is favourable in view of the valve arrangement and in view of the reduction of the length of a multi-cylinder combustion engine.

The invention further concerns a method for manufacturing a cylinder unit. This method consists in that a lining unit including a liner sleeve and a terminal wall is manufactured by a non-cutting forming method like cold impact forming, hot impact forming, deep drawing, tube reshaping, press molding and injection molding, and that hereupon the lining unit is inserted into the cylinder housing. The insertion of the lining unit into the cylinder housing may be performed in casting, die-casting or injection molding the cylinder housing around the lining unit.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

DESCRIPTION OF THE PREFERRED EMBODIMENTS

Figure 1:
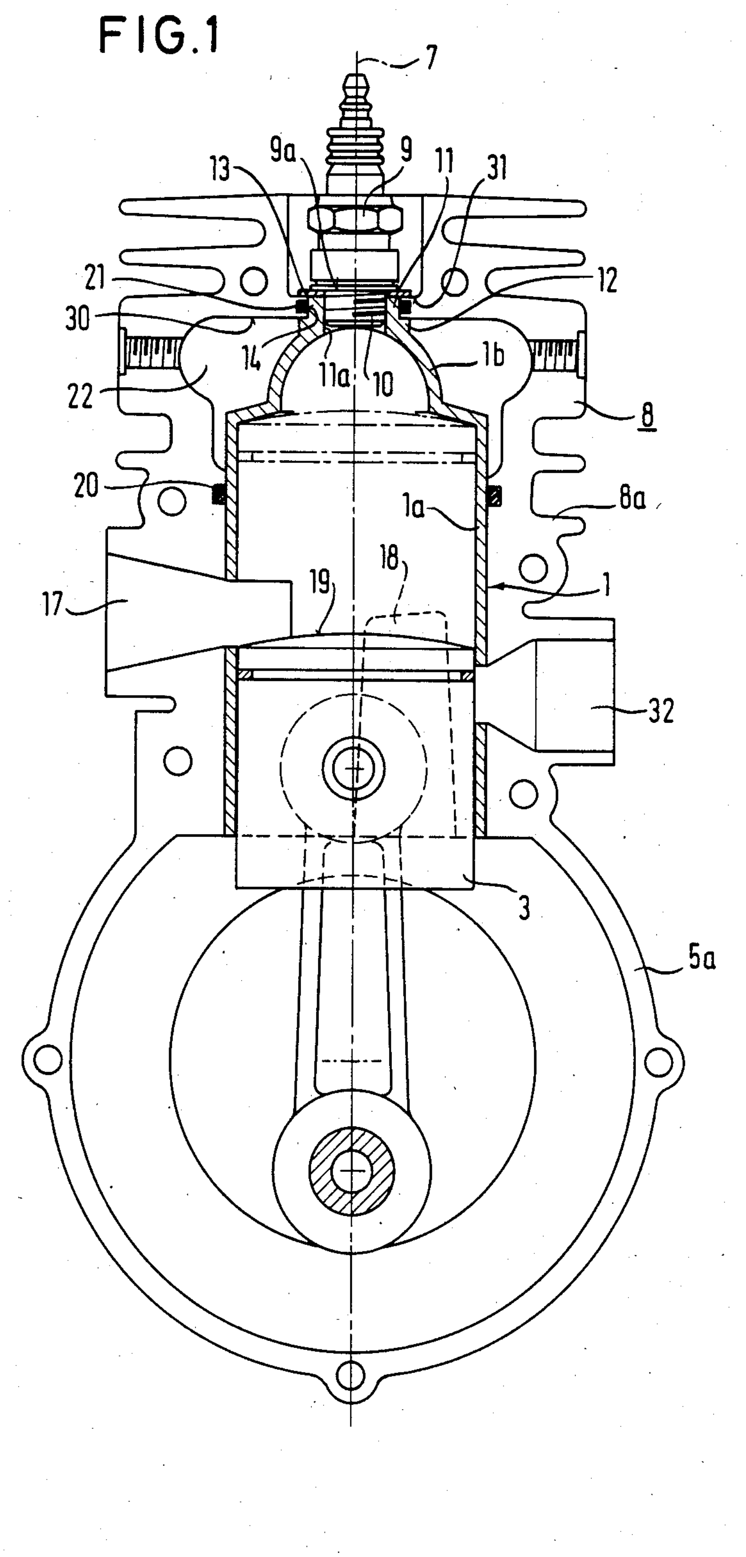
FIG. 1 is a longitudinal section along the axis of the liner sleeve of a two-stroke combustion engine.

FIG. 1 shows a two-stroke combustion engine. The engine comprises a lining unit 1 with a liner sleeve 1*a* and a terminal wall 1*b* integral with the liner sleeve 1*a*. The lining unit 1 has been manufactured by cold impact forming and comprises a circumferential face of the liner sleeve 1*a* and of the terminal wall 1*b* of high precision. No machining is necessary. The high precision is of particular importance as the compression ratio of modern combustion engines is more and more increased in view of reduction of fuel consumption, so that the space between the piston and the terminal wall of the liner becomes smaller and smaller. In commercial scale production of combustion engines no variations of the combustion ratio are acceptable, because such variations might result in knocking.

The lining unit 1 is clamped into a cylinder housing 8 which is divided into two cylinder halves along a plane containing the axis 7. Each cylinder half 8*a* is integral with a corresponding part 5*a* of a crank case. The liner sleeve 1*a* is fixed in axial direction by a spark plug 9 or, in case of a Diesel-engine, by an injection nozzle which may be located at the same location as the spark plug 9, as shown in FIG. 1. The terminal wall 1*b* is provided with a collar 11 having a internally threaded bore 11*a;* the collar 11 extends into an opening 14 of the cylinder housing 8.

The collar 11 is provided with a step 12 of increased diameter. This step 12 engages an internal face 30 of the cylinder housing 8, so that the lining unit 1 is fixed by the engagement of the step 12 and the internal face 30 in the direction of the piston 3 performing its compression stroke. In the other direction the lining unit is fixed in that a washer 13 is located between a shoulder 9*a* of the spark plug 9 and the bottom face 31 of a spark plug compartment. The washer 13 has a diameter larger than the opening 14 of the cylinder housing 8. By screwing the spark plug 9 with its external thread 10 into the internally threaded bore 11*a*, the lining unit 1 is fixed to the cylinder housing 8. In view of obtaining an even temperature distribution and further in view of removing the heat, a coolant chamber 22 is provided between the cylinder housing and the lining unit 1. This coolant chamber 22 is at least partially filled with a liquid coolant. Sealing rings 20 and 21 are provided between the lining unit 1 and the cylinder 8. The sealing ring 21 is located near the collar 11 and the sealing ring 20 is located above the gas exchange channels, namely the fresh gas entrance channel 32, the waste gas exit channel 17 and the connection channel 18 connecting the crank case and the combustion space. However, the sealing ring 20 is below the location taken by the upper edge 19 of the piston in the uppermost position of the piston. So the area of highest temperature is in contact with the coolant. No sealing problems arise. The coolant chamber 22 can be connected to an external heat exchanger.

The lining 1 is enclosed by two symmetrical cylinder halves 8*a*. A separate cylinder head is avoided and, moreover, machining of the inner faces of the lining unit can also be avoided in most cases.

Figure 2:
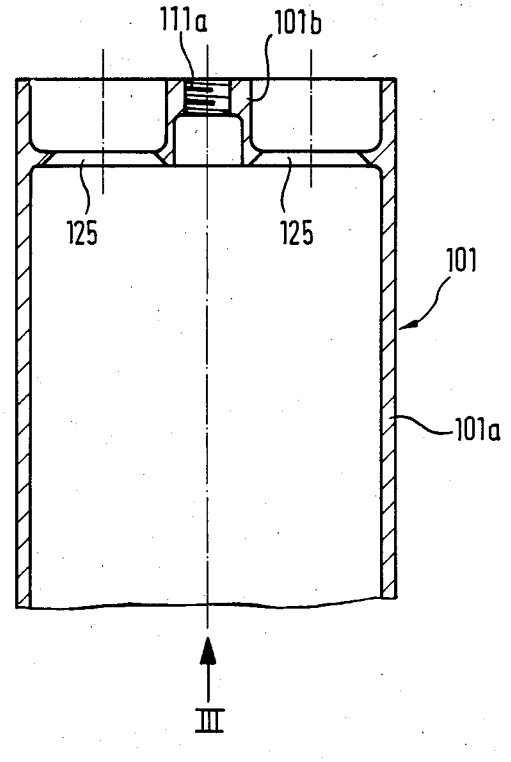
FIG. 2 is a longitudinal section along the axis of the lining unit of a four-stroke combustion engine.
Figure 3:
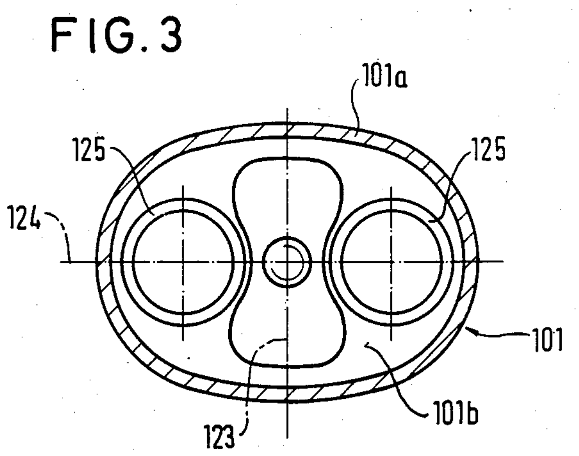
FIG. 3 is an end view of the lining unit of FIG. 2 when regarded in the direction of the arrow III of FIG. 2.

In FIGS. 2 and 3 a lining unit 101 for a four-stroke combustion engine is shown. The terminal wall 101*b* is integral with the liner sleeve 101*a*. The lining has been manufactured by cold impact forming. No machining of the inner faces of the lining unit is necessary. As shown in FIG. 3 the liner sleeve 101*a* has an elliptical cross-sectional area. By this elliptical form of the cross-sectional area of the liner sleeve, the length of a multi-cylinder combustion engine having the cylinders in series can be reduced. It is only necessary to arrange the cylinders in series such that the shorter axis 123 of the elliptical cross-sectional area coincides with the longitudinal direction of the series. A further advantage is that valve seats 125 arranged along the longer axis 124 can have an increased diameter as compared with the maximum possible diameter of cylinders with circular cross-sectional area. No problems arise in the manufacturing of correspondingly elliptical pistons as the manufacturing of non-circular pistons is known in the art. A further advantage of the non-circular piston is that the bolt connecting the piston and the piston rod can be shortened. A further advantage of the elliptical cross-sectional area is that it allows larger angular movement of the piston rod.

The lining units 1 and 101, respectively, are made of aluminum or steel alloy by cold impact forming, whereas the cylinder halves are castings of magnesium alloy. The lining units are clamped between the cylinder halves. The cold impact pressing is performed as follows: a female die is made corresponding to the external surface of the lining unit 1 and a male die is made corresponding to the inner surface of the lining unit 1. A disc of metal is positioned on the bottom of the female die. When the male die enters into the female die, the metal disc is reshaped such as to fill the space between the inner circumferential face of the female die and the outer circumferential face of the male die. This method can be performed, if necessary, in several steps.

Figure 4:
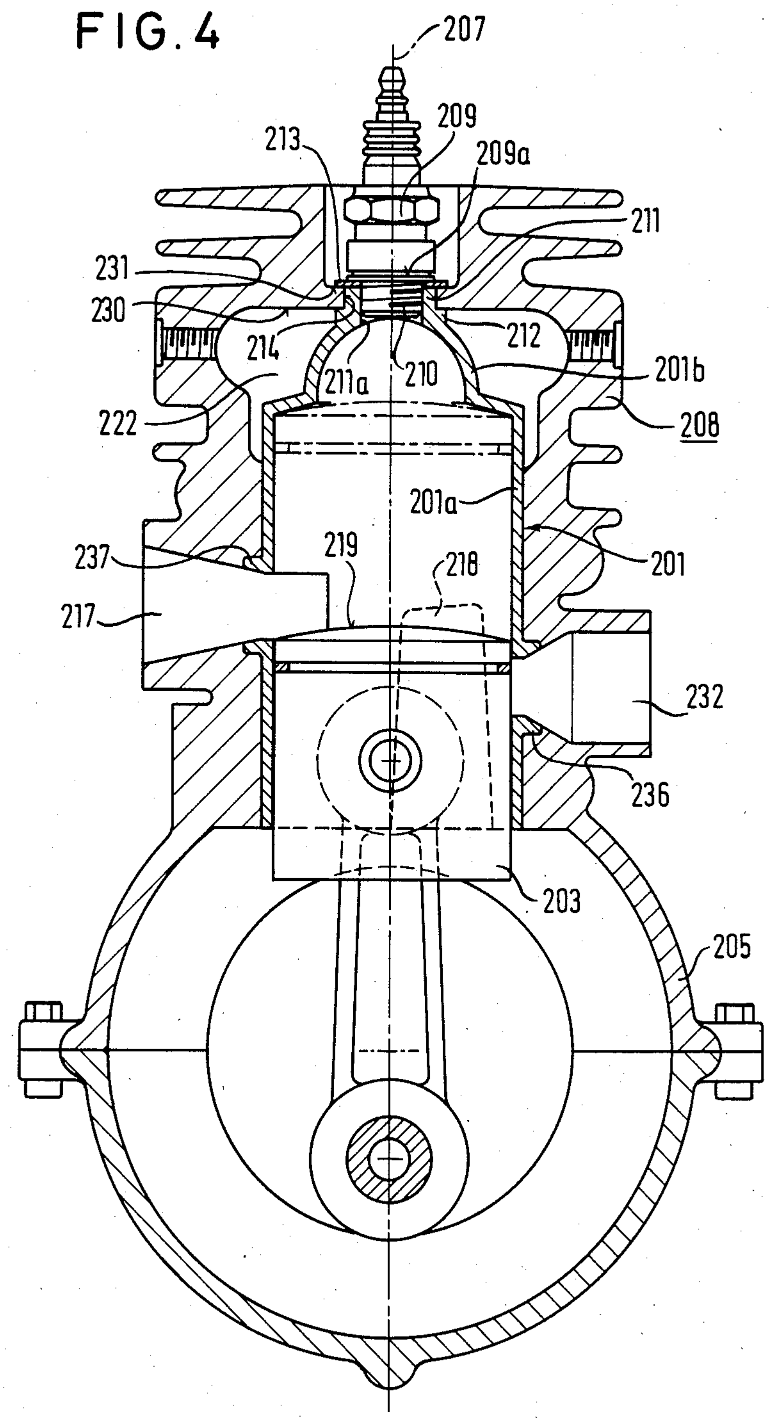
FIG. 4 is a longitudinal section according to FIG. 1 in a modified embodiment of the invention.

In FIG. 4 analogous parts are designated with the same reference numbers as in FIG. 1 increased by 200.

In the embodiment of FIG. 4 the cylinder housing 208 is a monoblock housing and is cast around the lining unit 201. Sealing rings can be avoided. Moreover, it is to be noted that the liner sleeve 201*a* is provided with ribs 236 and 237 along the slots for the gas exchange channels 232 and 217. The ribs 236 and 237 are embedded into the cast cylinder housing.

In this embodiment the crank case 205 may be subdivided such as to facilitate the introduction of the piston.

The ribs 236 and 237 are of importance for a precise forming of the edges of the openings; moreover they are favourable in view of reduction of thermal stress.

The plastic embodiment is of particular importance in view of a reduced noise level in operation of the combustion engine.

While specific embodiments of the invention have been shown and described in detail to illustrate the application of the inventive principles, it will be understood that the invention may be embodied otherwise without departing from such principles.

It is to be noted that the reference numerals in the claims are only provided in view of facilitating the understanding of the claims. These reference numerals are by no means to be understood as restrictive.

What is claimed is:

1. A method of manufacturing an axially extending cylinder unit having a pair of opposite ends spaced apart in the axial direction thereof for a cylinder piston combustion engine, said cylinder unit comprising an internal cylindrical guiding face for a piston extending in the axial direction of the cylinder unit and at least one internal combustion space limiting face at one end of the cylinder unit and extending, at least partially, transversely of the axial direction of the cylinder unit and forming a combustion space, said method comprising the steps of (a) forming the cylinder unit as a lining unit (1) having a longitudinal axis corresponding to the axis of the cylinder unit by one of the forming operations selected from the group consisting of cold impact forming, hot impact forming, deep drawing, press molding and injection molding, said lining unit being a monolithic unit including a cylindrical liner sleeve (1*a*) produced in the forming step and forming said internal cylindrical guiding face and further forming said internal combustion space limiting face, said cylindrical internal guiding face and said internal combustion space limiting face produced in the forming step being ready for operation without further machining, and said method further comprising the step of (b) incorporating said lining unit (1) into a cylinder housing (8).

2. A method as set forth in claim 1, including forming a cooling space defined between said lining unit (1) and said cylinder housing (8) when incorporating said lining unit into said cylinder housing.

3. A method as set forth in claim 1, including shaping said cylinder housing around said lining unit in an operation selected from the group consisting of casting, die casting and injection molding.

4. A method as set forth in claim 3, including providing at least one slot in said liner sleeve (1*a*) and aligning said slot with at least one gas exchange channel (17, 18, 32), extending through said cylinder housing (8).

5. A method as set forth in claim 4, including surrounding at least part of said slot with a rib (236, 237) projecting away from said combustion space and engaging a recess of said cylinder housing (208).

6. A method as set forth in claim 1, including providing said cylinder housing by forming the cylinder housing as cylinder halves (8) and applying the cylinder halves to said lining unit (1) from opposite sides thereof for approaching each other in a plane containing the axis of the lining unit (1), and clamping said lining unit between said cylinder halves (8*a*) by interconnecting said cylinder halves with clamping means.

7. A method as set forth in claim 1, including forming each of said lining unit (1) and said cylinder housing (8) from a different material.

8. A method as set forth in claim 1, including forming said lining unit (1) of metal.

9. A method as set forth in claim 8, including forming said lining unit (1) of ferro alloy.

10. A method as set forth in claim 8, including forming said lining unit of light metal.

11. A method as set forth in claim 10, including forming said lining unit (1) of an aluminum alloy.

12. A method as set forth in claim 1, including forming said lining unit (1) of plastics material.

13. A method as set forth in claim 12, including forming said lining unit (1) of carbonized plastics material.

14. A method as set forth in claim 12, including reinforcing the plastics material with fibers.

15. A method as set forth in claim 1, including forming the lining unit (1) with a terminal wall (1*b*) forming the at least one internal combustion limiting face and at least partially covering the terminal wall (1*b*) by a terminal wall of said cylinder housing (8).

16. A method as set forth in claim 15, forming at least one coolant chamber (22) between said lining unit (1)

and said cylinder housing (8) and forming said coolant chamber as an annular coolant chamber extending around the axis of said lining unit (1).

17. A method as set forth in claim 16, including providing sealing ring means between said lining unit (1) and said cylinder housing (8).

18. A method as set forth in claim 16, including locating the coolant chamber in the region of the terminal wall (1*b*) of said lining unit (1) and providing a terminal wall in said cylinder housing (8) also located in the region of the coolant chamber.

19. A method as set forth in claim 18, including providing overlapping openings (11*a*, 14) in said terminal wall (1*b*) of said lining unit and said terminal wall of said cylinder housing (8) and inserting a spark plug (9) in the overlapping openings.

20. A method as set forth in claim 19, including securing said terminal wall (1*b*) of said lining (1) and said terminal wall of said cylinder housing (8) against at least one of relative rotation and relative axial movement adjacent said overlapping openings (11*a*, 14).

21. A method as set forth in claim 15, including providing overlapping openings (11*a*, 14) in said terminal wall (16) of said lining unit and in said terminal wall of said cylinder housing (8), forming a collar (11) on said liner unit (1) surrounding said opening (11*a*) of said terminal wall (1*b*) and projecting into said opening (14) of said cylinder housing and providing a free end of said collar within said opening (14), threading an external threaded projection on an injection nozzle into an internal thread of said collar (11) and abutting a shoulder (9*a*) of said injection nozzle against an external face (31*a*) surrounding said opening (14) of said cylinder housing (8).

22. A method as set forth in claim 15, including forming a collar (11) on said liner unit (1) surrounding said opening (11*a*) of said terminal wall (1*b*) and projecting into said opening (14) of said cylinder housing and providing a free end of said collar within said opening (14), inserting a spark plug (9) with an external threaded projection into an internal thread in said collar (11) add positioning a shoulder (9*a*) of said spark plug abutting against an external face (31) surrounding said opening (14) of said cylinder housing (8).

23. A method as set forth in claim 22, including providing a washer (13) between said shoulder (9*a*) and said external face (31).

24. A method as set forth in claim 18, including forming overlapping openings (11*a*, 14) in said terminal wall (1*b*) of said lining unit and said terminal wall of said cylinder housing (8) and placing an injection nozzle in the overlapping openings.

25. A method as set forth in claim 18, including forming overlapping openings (11*a*, 14) in said terminal wall (1*b*) of said lining unit and said terminal wall of said cylinder housing (8), and placing a gas exchange valve unit in the overlapping openings.

26. A method as set forth in claim 1, including providing at least one sealing member (20, 21) between said cylinder housing (8) and said lining unit (1).

27. A method as set forth in claim 1, including forming said cylinder housing (8) of light metal.

28. A method as set forth in claim 27, including forming said cylinder housing (8) of a magnesium alloy.

29. A method as set forth in claim 27, including die casting said cylinder housing (8).

30. A method as set forth in claim 1, including forming said cylinder housing (8) of a plastics material.

31. A method as set forth in claim 30, including reinforcing the plastics material forming said cylinder housing with fibers.

32. A method as set forth in claim 30, including pressure molding of said cylinder housing.

33. A method as set forth in claim 30, including injection molding said cylinder housing (8).

34. A method as set forth in claim 1, including forming said cylinder housing (8) of a curable plastics material.

35. A method as set forth in claim 1, including forming said cylinder housing of two cylinder halves, placing said cylinder halves around said lining unit (1), clamping said cylinder halves together around said lining unit (1), and providing said cylinder halves integrally with corresponding cylinder halves of a crank case (5*a*).

36. A method as set forth in claim 1, including press fitting said lining unit within said cylinder housing (8).

37. A method as set forth in claim 1, including casting said cylinder housing of the housing material around said lining unit.

38. A method as set forth in claim 1, including die casting said cylinder housing of the housing material around said lining unit.

39. A method as set forth in claim 1, including injection molding said cylinder housing (208) of the housing material around said lining unit.

40. A method as set forth in claim 1, including forming said liner sleeve (108*a*) with an oval-shaped cross-section in a plane perpendicular to said axis of said liner sleeve, with said oval-shaped section having a shorter axis and a longer axis.

41. A method as set forth in claim 40, including forming two valve openings (125) in said terminal wall (101*b*) of said lining unit and spacing said valve openings along the longer axis of said oval-shaped cross-section.

42. A method as set forth in claim 40, including forming two valve openings (125) in said terminal wall (101*b*) of said lining unit and spacing said valve openings along the longer axis of said elliptical-shaped cross-section.

43. A method as set forth in claim 40, comprising forming said liner sleeve of a plurality of liner sleeve sections arranged in series with the longer axis (124) arranged transversely of the direction of the series of said liner sleeve sections.

44. A method as set forth in claim 1, including forming said inner sleeve (108*a*) with an elliptical-shaped cross-section in a plane perpendicular to said axis of said liner sleeve, with said elliptical-shaped section having a shorter axis and a longer axis.

45. A method as set forth in claim 44, comprising forming said liner sleeve of a plurality of liner sleeves arranged in series with the longer axis (124) arranged transversely of the direction of the series of said liner sleeves.

* * * * *